US011549484B2

(12) United States Patent
Bendel

(10) Patent No.: US 11,549,484 B2
(45) Date of Patent: Jan. 10, 2023

(54) APPARATUS AND METHOD FOR MANUFACTURING A ROTOR BLADE FOR A WIND TURBINE, AND A WIND TURBINE

(71) Applicant: Siemens Gamesa Renewable Energy Service GmbH, Hamburg (DE)

(72) Inventor: Urs Bendel, Fockbek (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 0 days.

(21) Appl. No.: 17/291,264

(22) PCT Filed: Oct. 23, 2019

(86) PCT No.: PCT/EP2019/078826
§ 371 (c)(1),
(2) Date: May 4, 2021

(87) PCT Pub. No.: WO2020/094395
PCT Pub. Date: May 14, 2020

(65) Prior Publication Data
US 2022/0003203 A1    Jan. 6, 2022

(30) Foreign Application Priority Data

Nov. 6, 2018   (DE) ..................... 10 2018 008 698.5

(51) Int. Cl.
*F01D 1/06*   (2006.01)
*F03D 1/06*   (2006.01)
(Continued)

(52) U.S. Cl.
CPC ............ *F03D 1/0675* (2013.01); *B05C 13/02* (2013.01); *B29C 66/524* (2013.01); *B29C 66/54* (2013.01);
(Continued)

(58) Field of Classification Search
CPC .............................. F03D 1/0675; B05C 13/02
See application file for complete search history.

(56) References Cited

U.S. PATENT DOCUMENTS 8,602,761 B2    12/2013  Arrizabalaga
2012/0138218 A1   6/2012  Dean et al.
(Continued)

FOREIGN PATENT DOCUMENTS

CN    102438799 A    5/2012
CN    102458806 A    5/2012
(Continued)

OTHER PUBLICATIONS

European Patent Office; Search Report in related International Patent Application No. PCT/EP2019/078826 dated Jan. 23, 2020; 6 pages.
(Continued)

*Primary Examiner* — Daniel McNally
(74) *Attorney, Agent, or Firm* — Dorton & Willis, LLP

(57) ABSTRACT

A device and a method for manufacturing a rotor blade for a wind energy installation, wherein the rotor blade includes at least two rotor blade shells which are bonded together, includes a holding device arranged to hold a rotor blade shell such that at least one bonding surface on the rotor blade shell and/or on a web attached to the rotor blade shell is exposed. The bonding surface of the rotor blade shell can be bonded to a further rotor blade shell. The device further includes a robot arm arranged to apply adhesive to the at least one bonding surface, a carriage on which the robot arm is mounted, and a guide device mounted on the holding device. The carriage is mounted on the guide device so as to be movable. The guide device is arranged to guide the carriage and the robot arm along the holding device, in particular along the bonding surface.

17 Claims, 2 Drawing Sheets

(51) Int. Cl.
*B05C 13/02* (2006.01)
*B29C 65/00* (2006.01)
*B29L 31/08* (2006.01)

(52) U.S. Cl.
CPC .......... *B29C 66/721* (2013.01); *B29C 66/863* (2013.01); *B29L 2031/085* (2013.01)

(56) References Cited

U.S. PATENT DOCUMENTS

| | | | |
|---|---|---|---|
| 2012/0199266 A1* | 8/2012 | Potter | ............... H01L 31/18 901/43 |
| 2015/0136305 A1* | 5/2015 | Ullmann | ............... B05C 5/0216 156/64 |
| 2015/0137419 A1* | 5/2015 | Ullmann | ............... F03D 1/0675 264/261 |
| 2016/0052012 A1 | 2/2016 | Mohr | |
| 2020/0130295 A1 | 4/2020 | Schibsbye | |

FOREIGN PATENT DOCUMENTS

| | | |
|---|---|---|
| CN | 104272206 A | 1/2015 |
| CN | 104395602 A | 3/2015 |
| CN | 105228813 A | 1/2016 |
| DE | 102012021658 A1 | 11/2013 |
| DE | 102012012298 A1 | 12/2013 |
| DE | 102013003688 A1 | 4/2014 |
| DE | 102013013038 A1 | 2/2015 |
| EP | 2447521 A2 | 5/2012 |
| EP | 2903805 A1 | 8/2015 |
| WO | 2010129492 A2 | 11/2010 |
| WO | 2013164101 A1 | 11/2013 |
| WO | 2014048440 A1 | 4/2014 |
| WO | WO-2014048440 A1 * | 4/2014 ........... B05C 5/0216 |

OTHER PUBLICATIONS

European Patent Office; Written Opinion in related International Patent Application No. PCT/EP2019/078826 dated Jan. 23, 2020; 10 pages.
German Patent Office; Search Report in related German Patent Application No. 10 2018 008 698.5 dated Sep. 6, 2019; 10 pages.
Chinese Patent Office; Examination Report in related Chinese Patent Application No. 201980070757.9 dated Jul. 6, 2022; 11 pages.

* cited by examiner

APPARATUS AND METHOD FOR MANUFACTURING A ROTOR BLADE FOR A WIND TURBINE, AND A WIND TURBINE

CROSS-REFERENCE TO RELATED APPLICATIONS

This application is a national phase application under 35 U.S.C. § 371 of International Patent Application No. PCT/EP2019/078826, filed Oct. 23, 2019 (pending), which claims the benefit of priority to German Patent Application No. DE 10 2018 008 698.5, filed Nov. 6, 2018, the disclosures of which are incorporated by reference herein in their entirety.

TECHNICAL FIELD

The invention relates to a device and a method for manufacturing a rotor blade for a wind energy installation, as well as to a wind energy installation.

BACKGROUND

Rotor blades for wind energy installations are often assembled from two separately manufactured rotor blade shells. In this context, the two rotor blade shells are bonded to one another at bonding surfaces respectively provided in the region of the leading edge or nose, as it is referred to, and the trailing edge, as it is referred to. Further, one or more webs can be provided in the interior of the rotor blade, via which the two rotor blade shells are additionally bonded together.

In the realization of the bonding required in each case, in particular its width, the metering of the quantity of the adhesive paste on the surfaces which are meant to produce a bond between one blade shell and another, or between the blade shells and the webs, plays an important role. It is already known to adjust, by the speed at which an application nozzle is manually passed over the bonding flanges by an operator, the amount of the adhesive being applied. In this context, the adhesive is provided by a pump unit with an attached supply unit, which are mounted on a trailer and are typically moved along the shape of the rotor blade by a forklift truck. However, the amount of adhesive applied in this way in each individual cross section of the bond is not always reproducible in a reliable manner. Further, this process is labor-intensive.

SUMMARY

It is an object of the invention to provide a device and a method for the improved manufacture of rotor blades, as well as a corresponding wind energy installation.

This object is solved by a device and a method for manufacturing a rotor blade, as well as a wind energy installation in accordance with the present disclosure.

According to a first aspect of the invention, a device for manufacturing a rotor blade for a wind energy installation, wherein the rotor blade comprises at least two rotor blade shells which are bonded to one another, comprises: a holding device which is arranged to hold a rotor blade shell in a position in which at least one bonding surface which is provided on the rotor blade shell and/or on a web which is attached to the rotor blade shell is exposed, at which bonding surface the rotor blade shell can be bonded to a further rotor blade shell, a robot arm which is arranged to apply adhesive to the at least one bonding surface, a carriage on which the robot arm is mounted, and a guide device which is mounted on the holding device, on which guide device the carriage is mounted so as to be movable, and which guide device is arranged to guide the carriage, together with the robot arm mounted thereon, along the holding device, in particular along the bonding surface.

According to a second aspect of the invention, in a method of manufacturing a rotor blade for a wind energy installation, wherein the rotor blade comprises at least two rotor blade shells which are bonded to one another, a rotor blade shell is held by means of a holding device in such a way that at least one bonding surface which is provided on the rotor blade shell and/or on a web which is attached to the rotor blade shell, on which bonding surface the rotor blade shell can be bonded to a further rotor blade shell, is exposed, and adhesive is applied to the at least one bonding surface by means of a robot arm, wherein the robot arm is attached to a carriage which is mounted so as to be movable along a guide device attached to the holding device, and which carriage is guided, together with the robot arm attached thereto, along the holding device, in particular along the bonding surface. Subsequently, the further rotor blade shell is brought into contact with the at least one bonding surface of the rotor blade shell provided with adhesive, as a result of which the two rotor blade shells are bonded to one another.

According to a third aspect of the invention, a wind energy installation comprises at least one rotor blade which has been manufactured using the device in accordance with the first aspect of the invention and/or using the method in accordance with the second aspect of the invention.

Preferred aspects of the invention are based on the approach of applying the adhesive to the bonding surfaces of the rotor blade shell with the aid of a robot arm which is movably mounted on, and movable along, a holding device which holds the rotor blade shell in a suitable position. The robot arm, which is also referred to as a manipulator, is preferably part of an industrial robot, as it is referred to, which is effectively a programmable machine for handling and/or assembling and/or processing workpieces and which in particular comprises the manipulator (robot arm), a control system and an effector (e.g. a nozzle, a tool, a gripper, etc.). In the context of the present invention, the terms robot arm, manipulator and industrial robot are used as synonyms. Preferably, the robot arm or the industrial robot further comprises one or more different sensors by means of which the respective actions carried out by the robot arm and/or effector can be detected, controlled and/or controlled with feedback. Preferably, the robot arm can be programmed in such a way that it is able to autonomously carry out the application of adhesive to the bonding surfaces and/or to vary, within certain limits, the application of adhesive to the bonding surfaces, in dependence upon sensor information.

By means of the invention, the reproducibility of the amount of adhesive which is applied to the respective bonding surfaces is significantly increased. Since the dispensing of the adhesive that is being applied is possible with a high degree of accuracy, costs can be saved when compared with a manual application of adhesive and the possible over application associated with this. In addition, the application of the adhesive is also faster, since the robot arm can move forward more quickly and more precisely, in particular in the longitudinal direction of the rotor blade shell and/or along bonding surfaces or glue lines, than, for example, an employee who manually guides the application nozzle. Further, as a rule, no reworking, or at least less reworking, is required, which reduces the cycle time which can be achieved for the application of adhesive to the bonding surfaces which are respectively provided on each rotor blade shell. Last but not least, personnel costs can be saved because the application of the adhesive can be carried out with fewer employees.

Overall, by means of the invention, the manufacture of rotor blades is improved, and a corresponding wind energy installation is provided.

Preferably, the holding device comprises a negative mold for manufacturing the rotor blade shell. The rotor blade shell is preferably made from a fiber composite material by inserting several layers of thin textile structures, in particular textile structures which are 0.5 mm to 2 mm thin, such as woven fabrics, knitted fabrics, scrim fabrics or nonwoven fabrics, into the negative mold and then applying resin to these using a resin infusion process. As an alternative, pre-impregnated fiber layers (prepregs, as they are referred to) can be used, in which the fiber layers are already embedded in resin, in particular in a layer of resin, and in which the fiber layers form a material bond after heating and, if applicable, after the application of negative pressure. In both cases, the surface of the fiber composite material assumes a shape which corresponds to the negative mold. As a result of this, there is no need for the rotor blade shell produced in the negative mold to be transferred, for example into a separate holder intended for the application of adhesive.

As an alternative or in addition, the rotor blade shell can be positioned, or is positioned, in the holding device in such a way that the at least one bonding surface which is provided on a leading edge and/or a trailing edge of the rotor blade shell and/or on a web which is attached to the rotor blade shell is exposed, i.e. that the at least one bonding surface is accessible at least from one side, in particular from above, for the robot arm, in particular for a nozzle which is provided on the robot arm for applying the adhesive. By means of this, a particularly favorable positioning of the rotor blade shell, in particular of the bonding surfaces, is ensured, which makes the application of the adhesive particularly simple, fast and reliably reproducible.

Preferably, the holding device has an upper region, in which in particular the negative mold is provided, a lower region and two lateral regions, wherein the guide device is attached to one of the lateral regions of the holding device. Preferably, the guide device comprises one or more guide rails, which run in particular in the longitudinal direction of the negative mold or of the rotor blade shell. By means of this, it becomes possible to achieve a mounting of the carriage or of the robot arm attached thereto on the holding device, in a manner which is space-saving, is robust, is free of play, or at least has little play.

Preferably, the robot arm has at least two rotational axes and/or at least two rotary joints. As an alternative or in addition, the robot arm may have at least one translational axis and/or at least one thrust joint. Preferably, the robot arm comprises a series of rigid links which are connected to one another by rotary joints and/or thrust joints, wherein the joints can be adjusted by controlled actuators. One end of this series of links is preferably attached to the carriage, while the other end can be moved freely and is equipped with a tool, in particular a nozzle. By means of this, it becomes possible to achieve a good mobility of the robot arm for a particularly reliably reproducible application of adhesive.

Further, it is preferred that the robot arm and/or the carriage and/or the guide device is/are set up to guide a free end of the robot arm along the bonding surface, which is located in particular on a leading edge and/or a rear edge of the rotor blade shell, and/or towards the bonding surface, which is located in particular on a web which is attached to the rotor blade shell. Preferably, the number and/or the length of the individual links and/or the number and/or the order of sequence of the rotary joints and/or the thrust joints is selected in such a way that the free end of the robot arm can reach the relevant bonding surface or bonding surfaces along the leading edge and/or the trailing edge or on the web.

Preferably, a nozzle is provided at the free end of the robot arm, which nozzle is set up to apply adhesive to the bonding surface. Preferably, the nozzle is mounted on the robot arm so as to be movable. By means of this, it is possible to always align the nozzle at the optimum angle with respect to the bonding surface when the adhesive is being applied.

Preferably, a feeding device is provided which is adapted to feed adhesive to the nozzle. Preferably, a valve device is provided which is arranged to control the amount of adhesive which is applied to the bonding surface by the nozzle and/or the amount of adhesive which is supplied to the nozzle. For example, the amount of adhesive applied and/or supplied is controlled by adjusting the size of a valve opening of the valve device, in particular by opening or closing the valve opening.

Preferably, a drive device is provided which is set up to bring about an advance of the carriage along the holding device, in particular along the bonding surface. By adjusting the speed of advance of the carriage and of the robot arm attached to it, the amount of adhesive applied or supplied can also be controlled, as an alternative or in addition to adjusting the valve opening.

In a further preferred embodiment, a control device is provided which is set up to control the valve device and/or the drive device as a function of the type of rotor blade to be manufactured, and/or as a function of the current position of the carriage in the longitudinal direction (z-direction) of the rotor blade and/or as a function of the type of bonding surface currently to be provided with adhesive and/or as a function of the position in space of the bonding surface currently to be provided with adhesive. The respective bonding surface or glue line currently to be provided with adhesive is, for example, the leading edge and/or the trailing edge of the rotor blade shell and/or the bonding surface of the at least one web. By adjusting the size of the valve opening of the valve device and/or the speed of advance generated by the advance device, the amount of adhesive which is applied to a bonding surface per unit of time can be adjusted in a particularly reliable and reproducible manner.

Further advantages, features and possible applications of the present invention will be apparent from the following description in connection with the figures.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
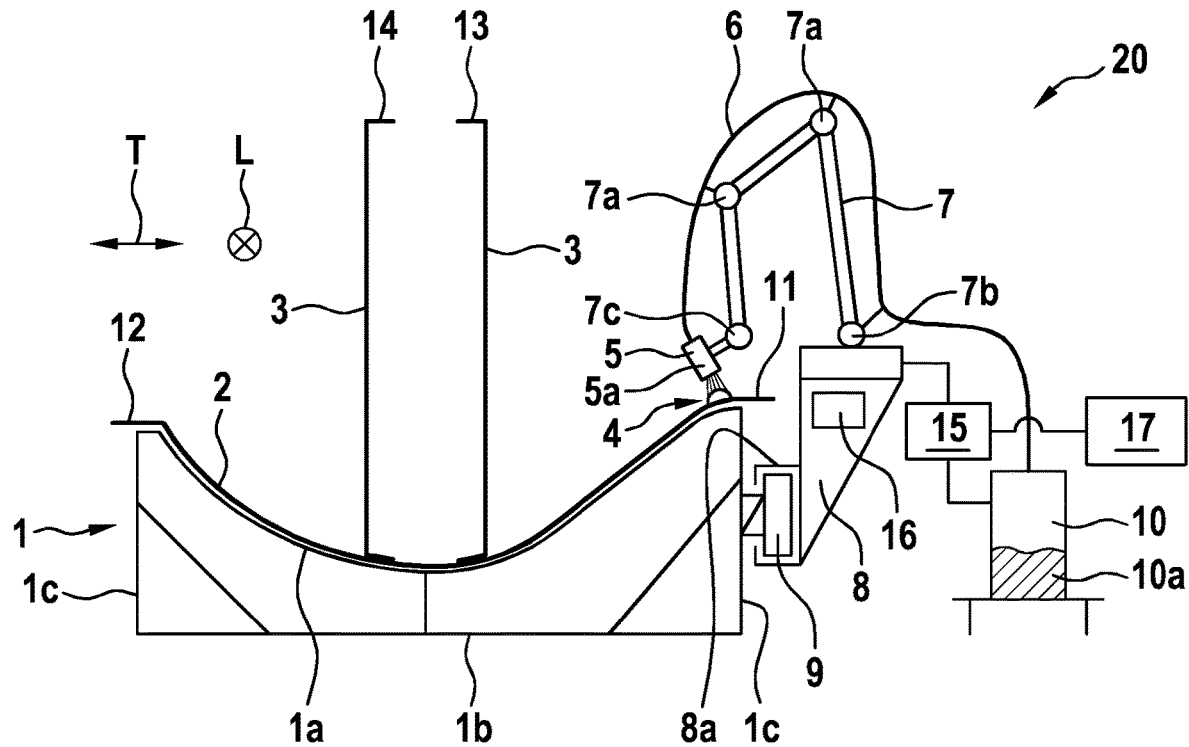
FIG. 1 is a schematic illustration of an exemplary device in the process of applying adhesive to a first bonding surface.

FIG. 1 shows a highly simplified cross-sectional view of an example of a device 20 in the process of applying adhesive 4 to a first bonding surface 11. The device 20 comprises a holding device 1, on the upper side of which there is a negative mold 1a which is intended for the manufacture of a rotor blade shell 2.

In order to manufacture the rotor blade shell 2, several layers of thin textile structures, such as woven fabrics, knitted fabrics, scrim fabrics or nonwoven fabrics, are preferably inserted into the negative mold 1a and are then provided with resin by means of a resin infusion process. As an alternative, pre-impregnated fiber layers (prepregs, as they are referred to), which are already embedded in resin, in particular a layer of resin, are placed in the negative mold 1a. After heating and, if applicable, after the application of negative pressure, these form a material bond. In both cases, the surface of the fiber composite material respectively obtained assumes a shape which corresponds to the negative mold 1a.

The rotor blade shell 2 is held or positioned in the holding device 1 in such a way that bonding surfaces 11, 12 are exposed, on which the rotor blade shell 2 can be bonded to a second rotor blade shell (not shown) of suitable construction. The bonding surfaces 11, 12 are preferably located at a leading edge and/or a trailing edge of the rotor blade shell 2. If the rotor blade shell 2 shown is, for example, a pressure-side rotor blade shell of a rotor blade, it is bonded to a suction-side rotor blade shell of the rotor blade, and vice versa.

In the present example, two webs 3 are attached to the inside of the rotor blade shell 2, on the free ends of which there are also provided bonding surfaces 13, 14, at which the rotor blade shell 2—in addition to the bonding surfaces 11, 12 respectively on the leading edge and the trailing edge—can be bonded to the inside of the second rotor blade shell.

In addition to a bottom region 1b, the holding device 1 has two lateral regions 1c, which may be constructed as continuous surfaces, for example in the form of side walls, or may however be constructed in the form of regions of openwork, for example in the form of supports and/or struts, and which extend substantially vertically.

A guide device 9 is attached to one of the lateral regions 1c, which guide device 9, in the present example, is constructed as a rail with a T-shaped cross section. Preferably, the guide device 9 can have more than one rail, in particular two rails.

The guide device 9, which is in particular constructed in the form of a rail or rails, runs substantially parallel to the longitudinal direction L of the rotor blade shell 2 or the holding device 1—which longitudinal direction L, in the present example, runs perpendicular to the drawing plane.

A carriage 8 is mounted on the guide device 9, which carriage 8 can be displaced in the longitudinal direction L. In the present example, the carriage 8 comprises two L-shaped profiles 8a which engage with the T-shaped profile of the rail of the guide device 9 from above and below.

A robot arm 7 is attached to the carriage 8, which robot arm 7, in the present example, has a total of three individual links which are connected to one another via rotary joints 7a. One end of the robot arm 7 is supported on the carriage 8 so that it is able to rotate, preferably via a further rotary joint 7b. A nozzle 5 is attached to the other, free end of the robot arm 7, which nozzle 5 is preferably supported on the robot arm 7 so as to be rotatable via a further rotary joint 7c.

In principle, the robot arm 7 may have more than, or less than, three links and/or more than, or less than, the rotary joints 7a, 7b, 7c shown. As an alternative or in addition, the robot arm 7 can have at least one thrust joint, which enables a translatory movement of one of the links of the robot arm 7 and/or enables one of the links of the robot arm 7 to be extended and/or shortened.

A supply device 6, for example in the form of a high-pressure hose, is connected to the nozzle 5, through which supply device 6 adhesive can be supplied to the nozzle 5. In the present example, the supply device 6 is connected to an adhesive storage container 10, in which adhesive 10a, for example synthetic resin and hardener, is located and which is preferably constructed as a movable carriage. Further, a high-pressure pump is preferably provided, by means of which the adhesive 10a is conveyed at high pressure through the supply device 6 to the nozzle 5.

A valve device 5a is provided on and/or in the nozzle 5, by means of which valve device 5a it is possible to control how much adhesive 4 is applied to a bonding surface 11 via the nozzle 5.

Further, a drive device 16 is provided, which, in the present example, is integrated in the carriage 8 and is set up to bring about an advancing movement of the carriage 8 along the guide device 9. As an alternative, the drive device 16 can also be arranged outside the carriage 8, for example on the guide device 9.

In addition, a control device 15 is provided, which is set up to control the advancing movement of the carriage 8 and/or the robot arm 7 and/or the valve 5 or the valve device 5a and/or the high-pressure pump or the high pressure for conveying the adhesive 10a to the nozzle 5. In this context, one or more of the components of the device 20 mentioned above are preferably controlled, or controlled with feedback, in such a way that an amount of adhesive 4 which is desired for the respective bonding surface 11 to 14 or predetermined is applied to the respective bonding surface 11 to 14. Preferably, the respective amount of the adhesive 4 applied is adjusted by controlling the size of an opening of the valve device 5a on the nozzle 5 and/or by controlling the speed of the advancing movement of the carriage 8. As an alternative or in addition, the amount of the adhesive 4 applied can be adapted to the desired width of the bonding by controlling the movement of the robot arm 7 and of the nozzle 5 attached thereto in the direction T of the profile depth of the rotor blade shell 2.

In the sense of the present invention, the terms "amount of adhesive" or "quantity of adhesive" are preferably intended to be understood to mean a volume and/or a weight of the adhesive 4 applied, in relation to the unit of area of the respective bonding surface 11 to 14, i.e., for example, milliliters per square centimeter or grams per square centimeter. As an alternative or in addition, however, the term "amount" or "quantity of adhesive" can also relate to the amount of adhesive 4 applied per unit of time, in particular during the advancing movement of the carriage 8, that is, for example, milliliters per second, grams per second, milliliters per second and square centimeter, or grams per second and square centimeter. As an alternative or in addition, however, "amount" or "quantity of adhesive" may also refer to the lateral extent and/or the height of the adhesive 4 respectively applied, that is, for example, to the width, in the direction T of the profile depth of the rotor blade shell 2, of a layer of adhesive applied to a bonding surface 11 to 14, and/or to the height of the adhesive layer.

Preferably, the control device 15 is set up to determine the amount of adhesive respectively to be applied on the basis of parameters and, in particular, to control the opening of the valve device 5*a* accordingly. The parameters are preferably the respective rotor blade type, the respective current z-position of the robot arm 7 or of the carriage 8 in the longitudinal direction L of the rotor blade shell 2 and/or the type of the bonding surface 11 to 14 respectively to be provided with adhesive 4, such as for example the leading edge 11, the trailing edge 12, the bonding surface 13 on the web 3 facing towards the leading edge 11, the bonding surface 14 on the web 3 facing towards the trailing edge 12, and/or the absolute position of the bonding surfaces, in particular of the bonding surfaces 13 and 14 of the webs 3, in space, etc. The parameters mentioned here can be specified by an operator and/or can however also be detected in an automatic manner, for example in a sensor-based manner, and can be stored in a memory or a buffer 17, which can be accessed by the control device 15.

Preferably, it is detected, for example by means of one or more sensors, when the carriage 8 and/or the robot arm 7 is/are in an initial position. The initial position can be located, for example, at one end of the rotor blade shell 2, for example at the blade root or the blade tip. If the movement of the carriage 8 and/or of the robot arm 7, in particular of the nozzle 5 located thereon, is further detected in a sensor-based manner, the exact position of the carriage 8 and/or of the robot arm 7 relative to the initial position (which forms a "zero point", as it were) and thus also relative to the rotor blade shell 2 can be determined therefrom. On the basis of the position determined, the application of adhesive, which may depend on the z-position in the longitudinal direction L and/or on the position in the direction of the profile depth T can be controlled in a correspondingly precise manner.

It is optionally envisaged that the device 20 has sensors which enable the position of the bonding surfaces 11 to 14 in space to be determined and to be compared with a target position stored in advance. In accordance with this comparison, the amount of adhesive to be applied can then be adjusted with respect to the nominal amount of adhesive previously specified. More adhesive can be applied if a larger bonding gap has been calculated between the bonding surface analyzed and the second rotor blade shell, and, in a corresponding manner, less adhesive can be applied if a smaller gap has been calculated. The device can also generate a warning on the basis of this analysis if the calculated bonding gap exceeds, or falls below, certain specified limits.

In the example shown in FIG. 1, the application of the adhesive is carried out in the region of a bonding line or bonding surface 11 which faces towards the robot arm 7 along a leading edge of the rotor blade shell 2. The device 20, in particular the robot arm 7, is preferably constructed and/or controlled in such a way that adhesive 4 can also be applied to other bonding lines or bonding surfaces 12 to 14 in the manner which has been described above. This is described in the following by way of example.

Figure 2:
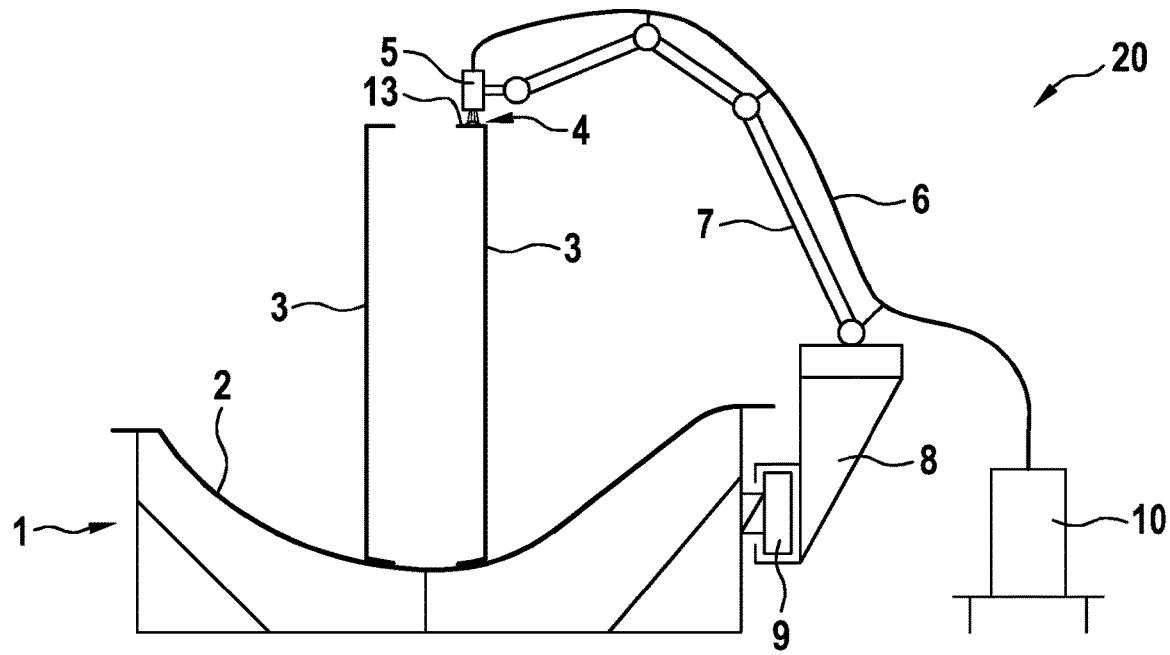
FIG. 2 illustrates an example of a device in the process of applying adhesive to a second bonding surface.

In the example shown in FIG. 2, the application of the adhesive is carried out on the bonding line or bonding surface 13 which faces towards the robot arm 7 along the leading edge web 13 of the rotor blade.

Figure 3:
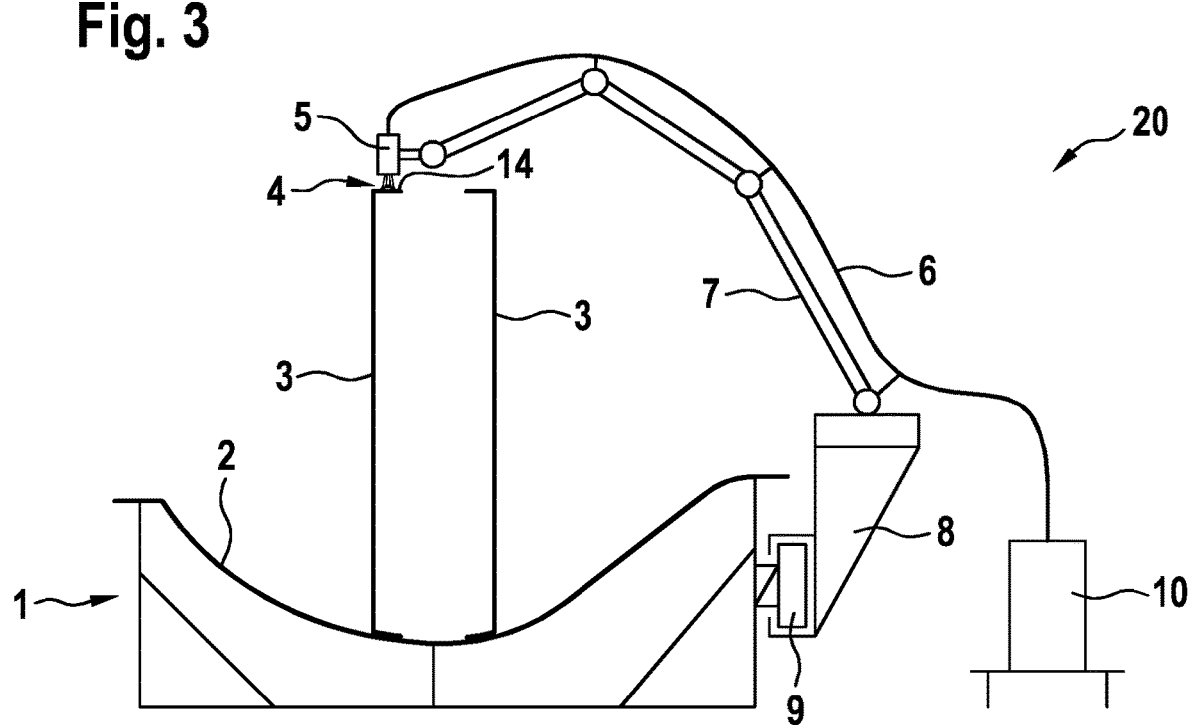
FIG. 3 illustrates an example of a device in the process of applying adhesive to a third bonding surface.

In the example shown in FIG. 3, the application of the adhesive is carried out on the bonding line or bonding surface 14 which faces away from the robot arm 7 along the trailing edge web 14 of the rotor blade.

Figure 4:
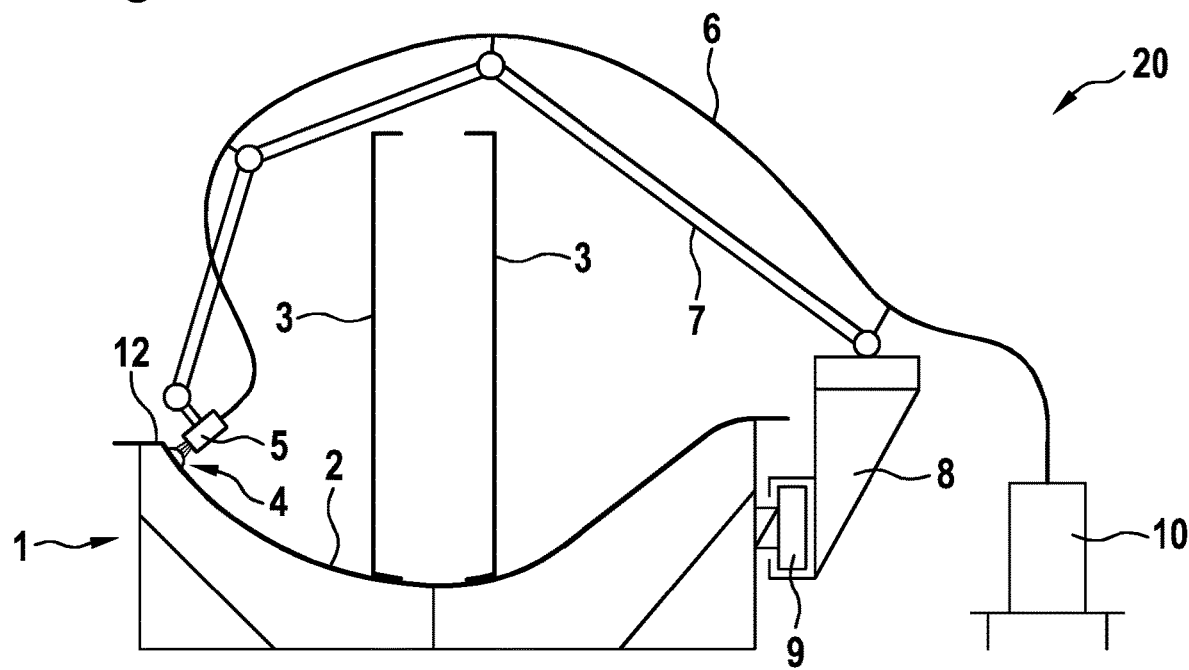
FIG. 4 illustrates an example of a device in the process of applying adhesive to a fourth bonding surface.

In the example shown in FIG. 4, the application of the adhesive is carried out in the region of a bonding line or bonding surface 12 which faces away from the robot arm 7 along a trailing edge 12 of the rotor blade shell 2.

With regard to the structure and the principle of operation of the device 20, the above explanations in connection with FIG. 1 also apply accordingly to the examples shown in FIGS. 2 to 4.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A device for manufacturing a rotor blade for a wind energy installation, wherein the rotor blade includes at least two rotor blade shells that are bonded to one another, the device comprising:
   a holding device configured to hold a rotor blade shell in a position in which at least one bonding surface, which is provided on at least one of the rotor blade shell or on a web attached to the rotor blade shell, is exposed, at which bonding surface the rotor blade shell is adapted to be bonded to a further rotor blade shell;
   a guide device mounted on the holding device;
   a robot arm configured to apply adhesive to the at least one bonding surface;
   a carriage movably supported by the guide device and supporting the robot arm thereon;
   wherein the guide device is configured to guide the carriage, together with the robot arm mounted thereon, along the holding device;
   a nozzle provided at the free end of the robot arm and configured to apply adhesive to the bonding surface;
   a valve device configured to control at least one of:
      the amount of adhesive which is applied to the bonding surface by the nozzle, or
      the amount of adhesive which is supplied to the nozzle; and
   a control device configured to control the valve device as a function of the type of rotor blade to be manufactured.

2. The device of claim 1, further comprising a drive device configured to advance the carriage along the holding device.

3. The device of claim 2, wherein the drive device is configured to advance the carriage along the at least one bonding surface of a rotor blade shell on the holding device.

4. The device of claim 2, further comprising:
   a control device configured to control the drive device as a function of at least one of:
      the type of rotor blade to be manufactured,
      the current position of the carriage in a longitudinal direction of the rotor blade shell,
      the type of bonding surface currently to be provided with adhesive, or
      a position in space of the bonding surface currently to be provided with adhesive.

5. The device of claim 1, wherein:
   the holding device comprises an upper region, a lower region, and two lateral regions extending between the upper and lower regions;

the guide device is attached to one of the lateral regions of the holding device;

the at least one bonding surface comprises a first bonding surface along a first side of the rotor blade shell and a second bonding surface along a second side of the rotor blade shell, the second side of the rotor blade shell being opposite the first side of the rotor blade shell, and the robot arm is dimensioned and configured such that it is able to apply adhesive to the first and second bonding surfaces while the carriage is movably supported by the guide device attached to said one lateral region of the holding device.

6. The device of claim 5, wherein at least one of:

the first bonding surface is located towards said one lateral region of the holding device which the guide device is attached to; or the robot arm is dimensioned and configured such that it is able to apply adhesive to the first and second bonding surfaces while the at least one web is attached to the rotor blade shell.

7. The device of claim 6, wherein:

the robot arm is configured to reach over the at least one web in order to reach the second bonding surface.

8. The device of claim 1, wherein:

the holding device comprises an upper region, a lower region, and two lateral regions extending between the upper and lower regions; and the guide device is attached to one of the lateral regions of the holding device.

9. The device of claim 8, wherein the upper region of the holding device comprises a negative mold configured for manufacturing the rotor blade shell.

10. The device of claim 1, wherein the guide device is configured to guide the carriage along the holding device such that the at least one bonding surface is accessible to the robot arm.

11. The device of claim 1, wherein the holding device comprises a negative mold configured for manufacturing the rotor blade shell.

12. The device of claim 1, wherein the robot arm comprises at least one of:

at least two rotational axes; or at least one translational axis.

13. The device of claim 1, wherein:

at least one of the robot arm, the carriage, or the guide device is configured to at least one of:

guide a free end of the robot arm along the bonding surface, or guide a free end of the robot arm towards the bonding surface; or the bonding surface is located on at least one of:

a leading edge of the rotor blade shell, a rear edge of the rotor blade shell, or on a web attached to the rotor blade shell.

14. The device of claim 1, wherein the nozzle is movably mounted on the robot arm.

15. The device of claim 1, further comprising a feeding device adapted to feed adhesive to the nozzle.

16. The device of claim 1, wherein:

the control device is further configured to control the valve device as a function of at least one of:

the current position of the carriage in a longitudinal direction of the rotor blade shell, the type of bonding surface currently to be provided with adhesive, or a position in space of the bonding surface currently to be provided with adhesive.

17. The device of claim 1, further comprising:

a drive device configured to advance the carriage along the holding device; and a control device configured to control at least one of the valve device or the drive device as a function of at least one of:

the type of rotor blade to be manufactured, the current position of the carriage in a longitudinal direction of the rotor blade shell, the type of bonding surface currently to be provided with adhesive, or a position in space of the bonding surface currently to be provided with adhesive.

* * * * *